United States Patent [19]

Naudin et al.

[11] Patent Number: 5,092,820
[45] Date of Patent: Mar. 3, 1992

[54] TORSION DAMPING DEVICE WITH FRICTION PADS, IN PARTICULAR FOR AUTOMOTIVE VEHICLES

[75] Inventors: Jacky Naudin, Metz-Vallieres; Ciriaco Bonfilio, Clichy, both of France

[73] Assignee: Valedo, Paris, France

[21] Appl. No.: 586,307

[22] Filed: Sep. 21, 1990

[30] Foreign Application Priority Data

Sep. 26, 1989 [FR] France ............................ 89 12568

[51] Int. Cl.⁵ ............................ F16D 3/14; F16D 3/66
[52] U.S. Cl. .................................. 464/68; 192/106.2; 464/66
[58] Field of Search ...................... 464/64–68; 192/106.1, 106.2; 74/574

[56] References Cited

U.S. PATENT DOCUMENTS

| | | | |
|---|---|---|---|
| 2,002,115 | 5/1935 | Kjaer | 64/100 |
| 4,347,717 | 9/1982 | Lamarche | 464/64 |
| 4,530,673 | 7/1985 | Lamarche | 464/64 |
| 4,690,257 | 9/1987 | Suzuki et al. | 192/106.2 X |
| 4,722,715 | 2/1988 | Billet et al. | 464/67 |
| 4,838,395 | 6/1989 | Chasseguet et al. | 464/66 X |

FOREIGN PATENT DOCUMENTS

| | | |
|---|---|---|
| 0082595 | 6/1983 | European Pat. Off. . |
| 3628451 | 3/1988 | Fed. Rep. of Germany . |
| 2495256 | 6/1982 | France . |
| 2571461 | 4/1986 | France . |
| 2620501 | 3/1989 | France . |

Primary Examiner—Daniel P. Stodola
Assistant Examiner—William G. Battista, Jr.
Attorney, Agent, or Firm—Longacre & White

[57] ABSTRACT

A torsion damping device of the kind comprising two rotatable parts with coil springs interposed between them. At least one friction pad is associated with each spring so as to come into engagement with a contact zone of one of the said coaxial parts.

In accordance with the invention, there is associated with each of the friction pads an intermediate resilient member which is radially deformable and which has a first engagement zone for engagement with a turn of the spring, together with a second engagement zone for contact with the friction pad, the intermediate resilient member being interposed radially between the friction pad and the spring.

10 Claims, 10 Drawing Sheets

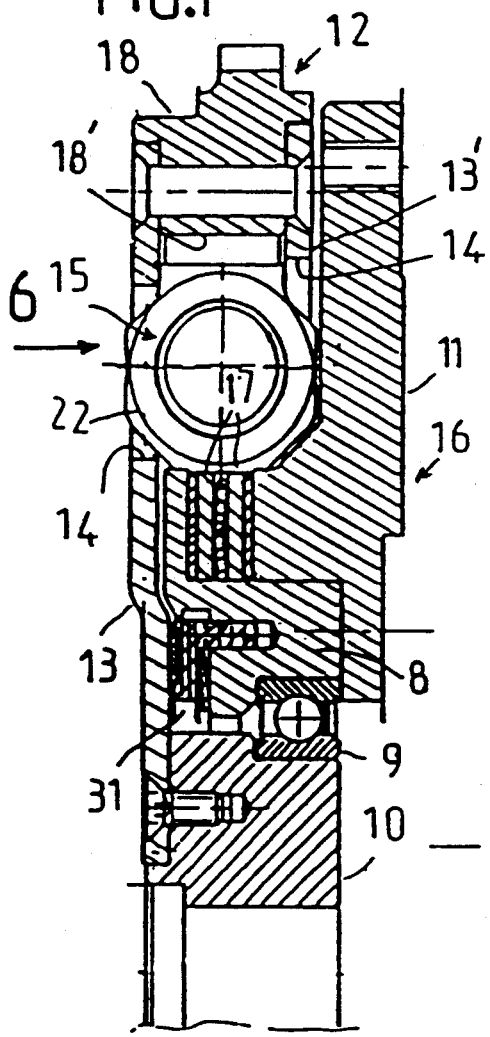
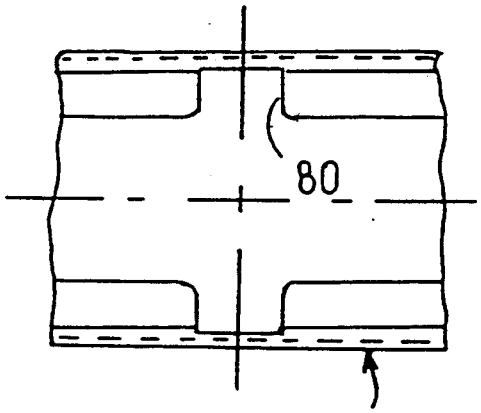
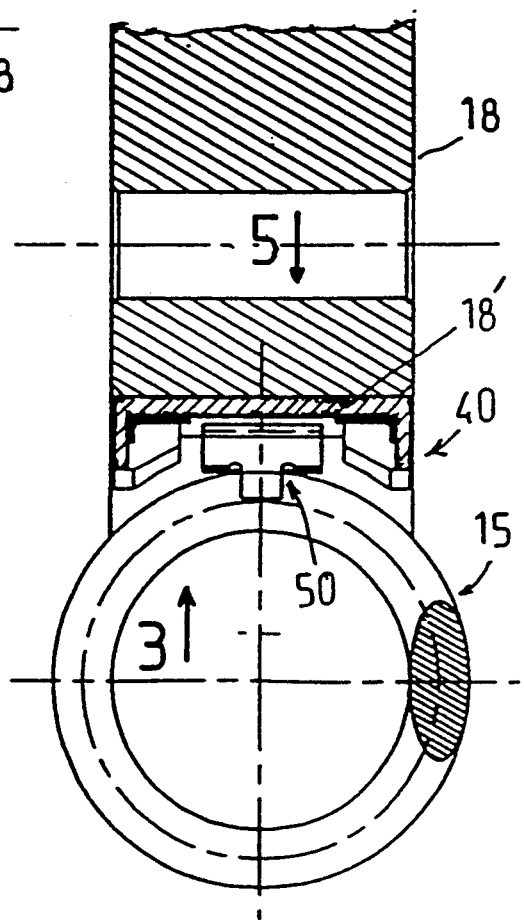
PRIOR ART

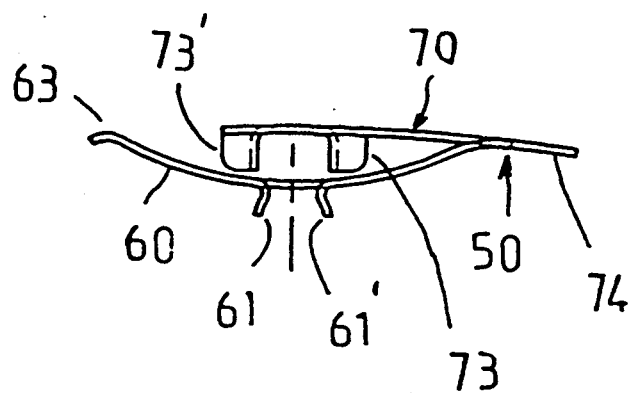
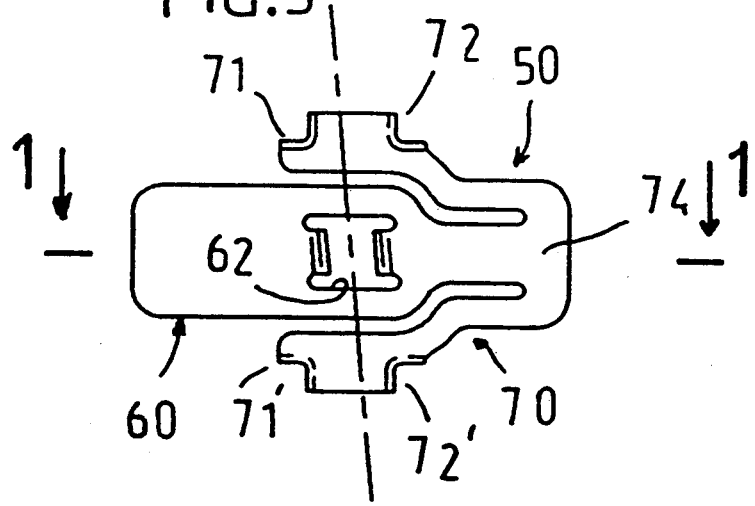

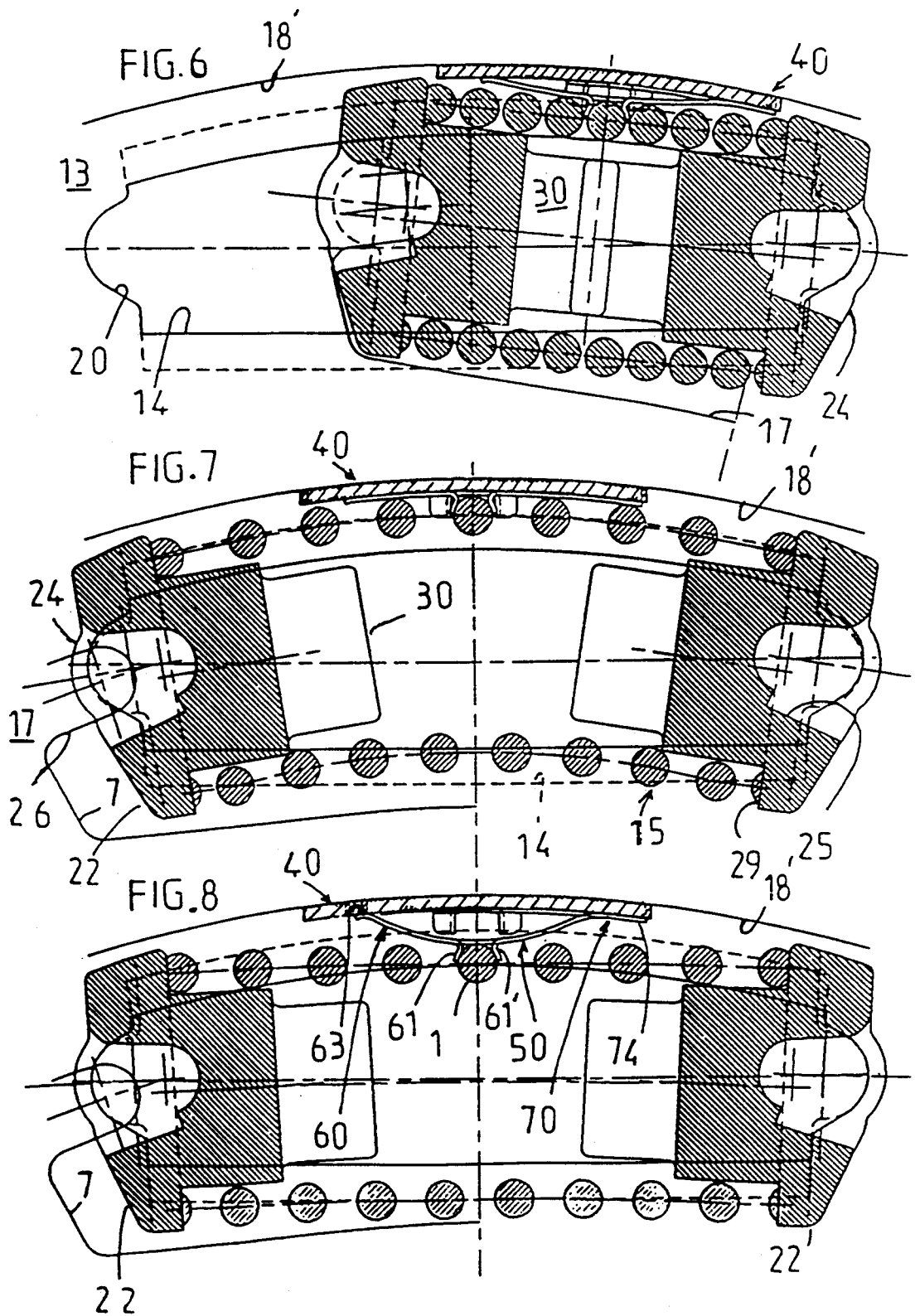

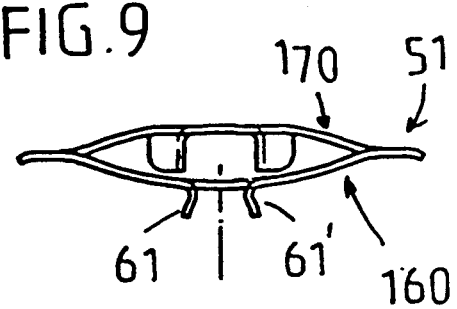
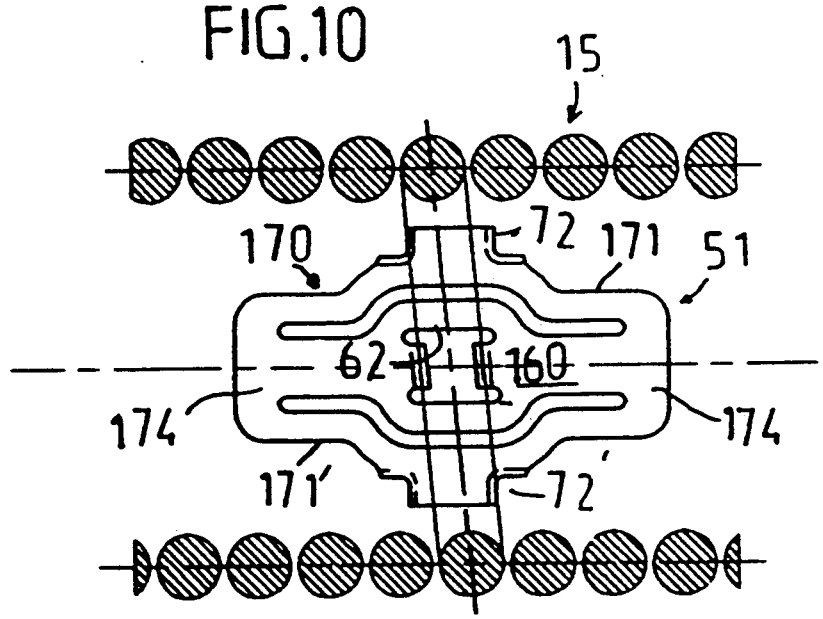

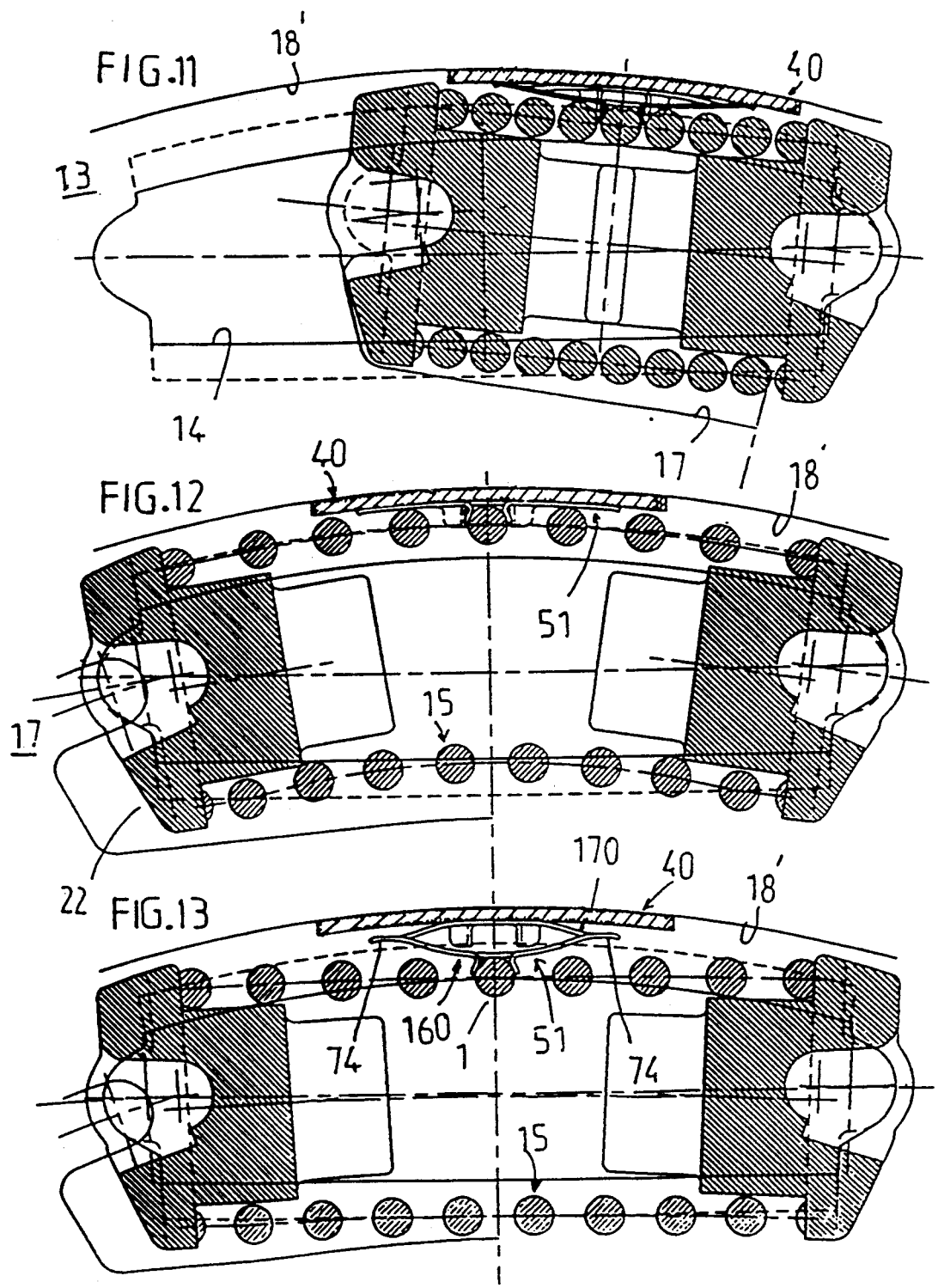

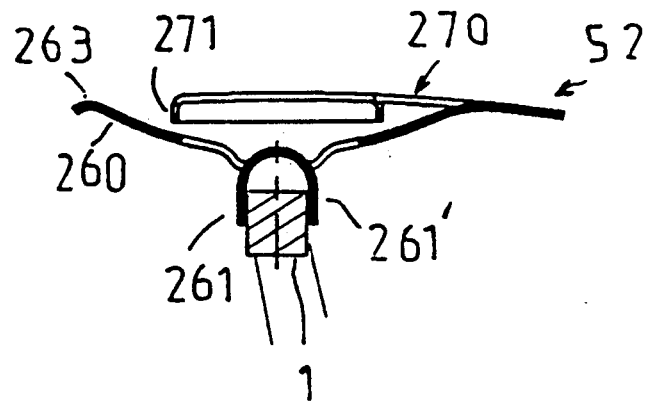
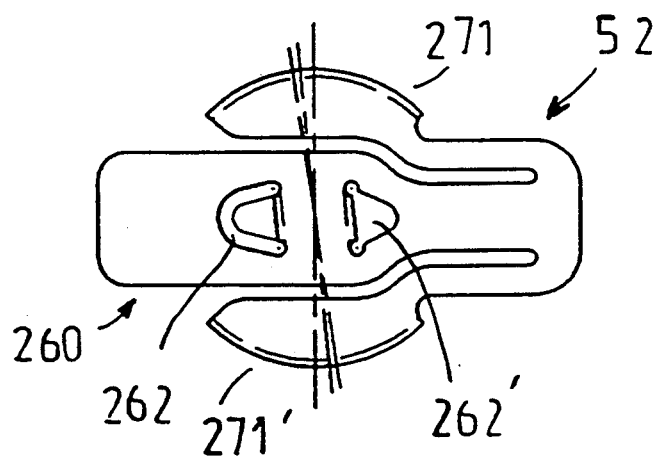

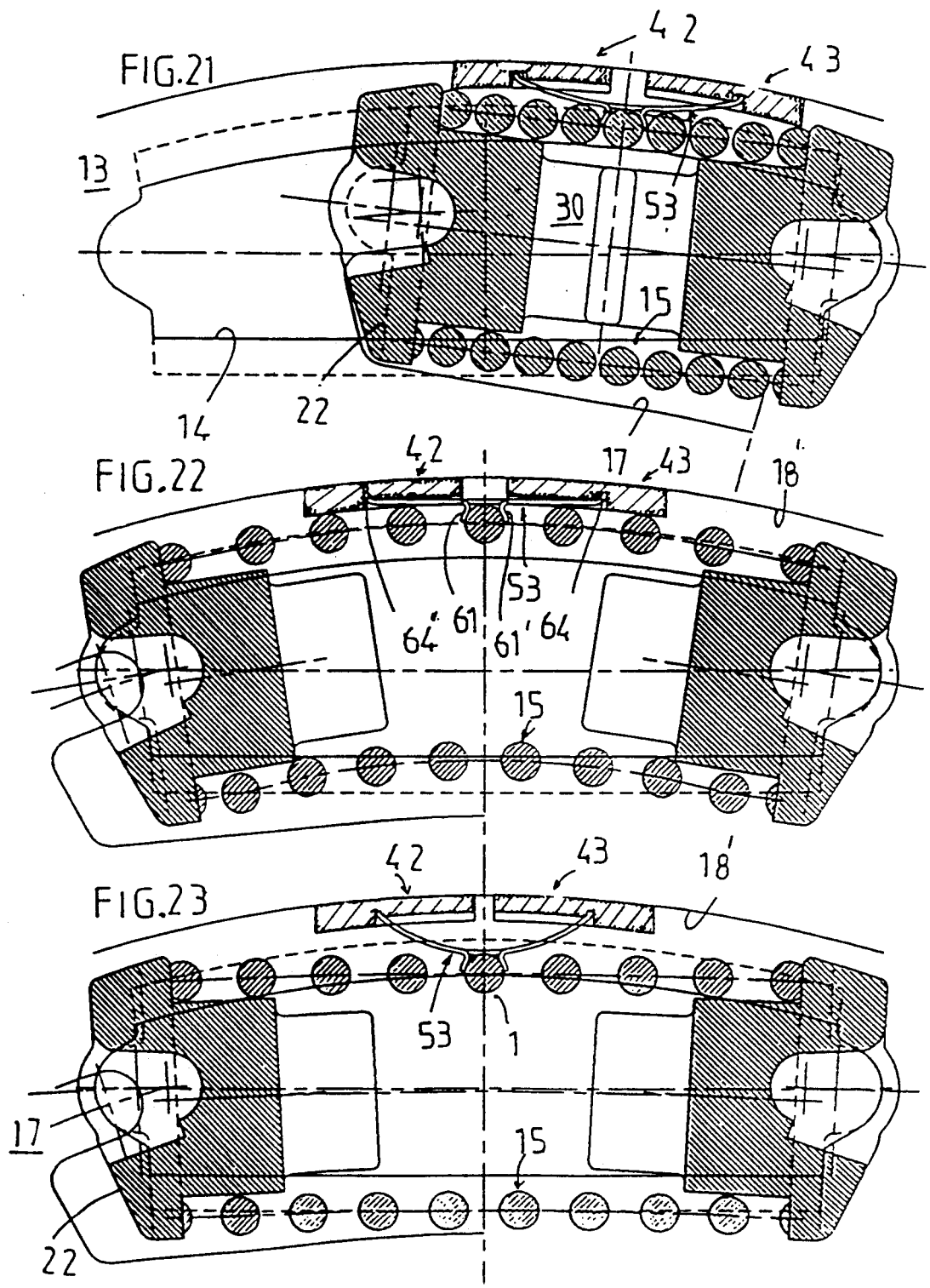

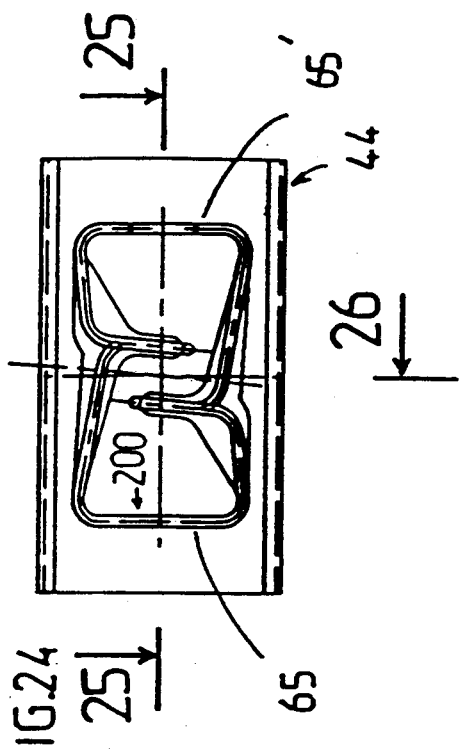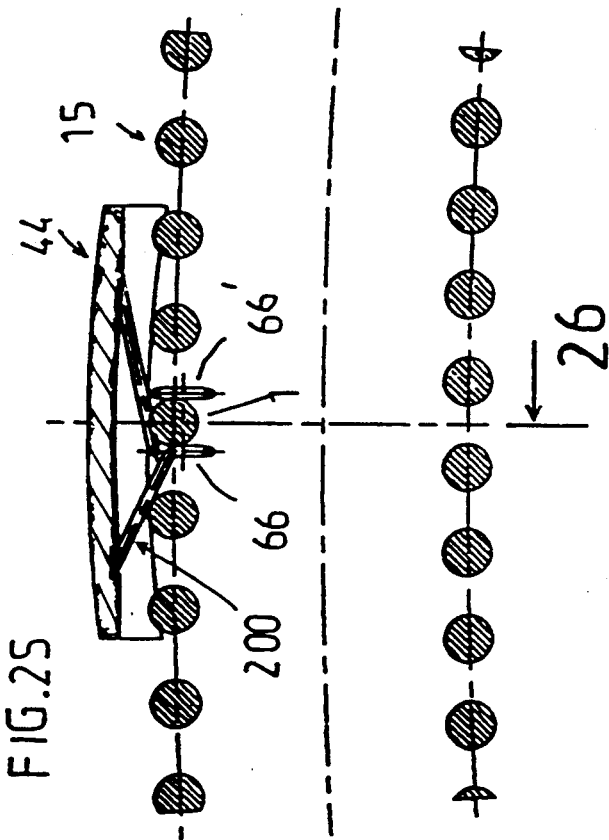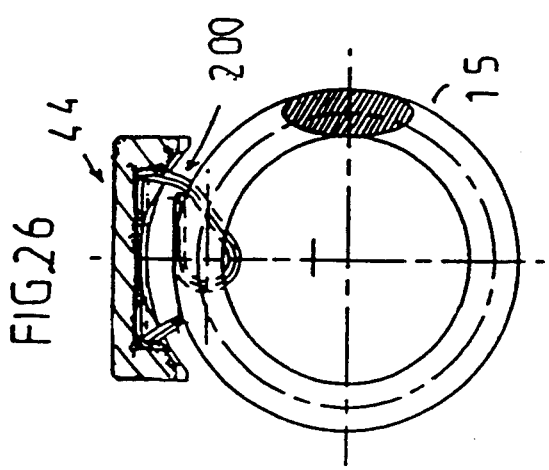

TORSION DAMPING DEVICE WITH FRICTION PADS, IN PARTICULAR FOR AUTOMOTIVE VEHICLES

FIELD OF THE INVENTION

This invention relates to a torsion damping device for a transmission, in particular for the transmission of an automotive vehicle, of the kind which comprises two rotatable parts mounted coaxially for angular displacement with respect to each other, and further comprising coil springs mechanically interposed between the two said rotatable coaxial parts.

BACKGROUND OF THE INVENTION

A device of the above kind is described in U.S. Pat. No. 2,002,115, in which one of the said coaxial parts includes a contact zone on which at least one friction pad is in frictional egagement. This friction pad has a protuberance by which it is mounted on one of the turns of an associated said spring. With this arrangement, it is possible to avoid, firstly deterioration of the contact zone by, in particular, fretting of the turns of the spring, and secondly uneven wear as between some portions of the springs and others, leading to weakening or even to fracture of the springs.

That arrangement is quite satisfactory when the friction pads are initially in engagement with the contact zone, as is indeed the case in the arrangement taught by U.S. Pat. No. 2,002,115. However, when the springs are shorter, a dead zone may exist initially, to extend radially between the friction pad and the said contact zone, so that the friction pad will only come into engagement with the contact zone after some deformation of the spring has taken place radially outwardly. As a result, the friction pad may become disengaged and/or may become displaced into an inappropriate position leading to malfunctioning of the device.

Such a consideration is relevant for example in the case of a double flywheel damper, such as that described in French published patent application No. FR 2 571 461A, in which the springs are short, being arranged on a pitch circle of large diameter. In addition, they are mounted through pivoting thrust inserts on one of the coaxial parts of the damper, with a large radial gap initially existing between the spring and the contact zone.

In order to overcome this problem, the friction pad may be extended inwardly so as to give it a wedge-shaped configuration, whereby it can penetrate between two turns of the spring in the manner described in U.S. Pat. No. 4,530,673.

However, such an arrangement tends to reduce the useful length of the spring. Another solution is to cut each spring in half, and to interpose between the two halves a central insert in the manner described in U.S. Pat. No. 4,838,395 and the corresponding French published patent application No. FR 2 620 501A. Such an arrangement is again not satisfactory because it tends to reduce the performance of the damper.

DISCUSSION OF THE INVENTION

An object of the present invention is to overcome the above disadvantages, and thus to provide a novel arrangement of friction pads which, in a simple and economic manner, will allow each friction pad to be in contact with its associated contact zone under all circumstances, while involving the least possible modification to the useful length of the coil spring and while also producing further advantages.

In accordance with the invention, a device of the kind defined above is characterised in that there is, associated with each friction pad an intermediate resilient member which is radially deformable and which has a first engagement zone for engagement with a turn of the spring, together with a second engagement zone for contact with the said friction pad, the said resilient member being interposed radially between the said friction pad and the said spring, so that the spring is able to change, during operation, between an extended mode and a retracted mode, with the friction pad being in permanent engagement with the said contact zone.

This arrangement enables the friction pad to avoid becoming disengaged, and prevents it being displaced to a detrimental position. In addition, the useful working length of the coil spring is substantially unchanged, due to the fact that the intermediate resilient member is attached on one turn of the spring. By contrast with the arrangement described in French published patent application No. FR 2 620 501A, the spring does not need to be modified.

Again, the springs do not need to be cut, so that the performance of the damping device is not reduced; and the arrangement can be fitted on to an existing damping device.

Finally, by contrast with the arrangement described in U.S. Pat. No. 4,884,996 and the corresponding French published patent application No. FR 2 605 370A, the friction pad is not mounted for sliding movement with respect to the coil spring, so that any tendency to jamming is avoided.

According to a preferred feature of the invention, the first engagement zone includes thin tongues or arms which are arranged on either side of the associated turn of the spring for gripping the latter. Because of their low thickness, these tongues or arms still allow adjacent turns of the springs to come virtually into contact with each other in the retracted mode.

The intermediate resilient means in accordance with the invention may be in the form of a resilient web, or of suitably shaped elastic wires, or it may be of elastomeric material.

It will be appreciated that the invention offers a large number of possibilities for variation within the scope of the invention, wherein the intermediate resilient member is preferably mounted under pre-stress, and the coil spring may be of any shape whatever.

The description which follows illustrates the invention, by way of example only, in a number of embodiments in the context of a double flywheel damper for automotive vehicles, and with reference to the accompanying drawings.

BRIEF DESCRIPTION OF THE DRAWINGS

FIG. 1 is a view in axial cross section showing one half of a double flywheel which does not have a friction pad in accordance with the invention, being of the kind described in Frech published patent application No. FR 2 571 461A.

FIG. 2 is a partial view in axial cross section, similar to FIG. 1 but with the damper plates omitted, and shows a friction pad and associated intermediate resilient member in accordance with the invention.

FIG. 3 is a partial view on the friction pad as seen in the direction of the arrow 3 in FIG. 2.

FIG. 4 is a view in cross section of the intermediate resilient member, taken on the line I—I in FIG. 5.

FIG. 5 is a top plan view on the intermediate resilient member, as seen in the direction of the arrow 5 in FIG. 2.

FIGS. 6 to 8 are diagrammatic views, as seen in the direction of the arrow 6 in FIG. 1, showing different stages in the operation of the damping device.

FIGS. 9 and 10 are similar to FIGS. 4 and 5, but show a second embodiment.

FIGS. 11 to 13 are similar to FIGS. 6 and 8, but for this second embodiment.

FIGS. 14 and 15 are views similar to FIGS. 4 and 5, but showing a third embodiment.

FIGS. 21 to 23 are views similar to FIGS. 6 to 8, for this fourth embodiment.

FIG. 24 is a view as seen from below, showing the friction pad, equipped with the intermediate resilient member, in a further embodiment.

FIG. 25 is a view in cross section taken on the line 25—25 in FIG. 24, with the coil spring shown diagrammatically.

FIG. 26 is a view in axial cross section, taken on the line 26—26 in FIG. 25.

DESCRIPTION OF PREFERRED EMBODIMENTS OF THE INVENTION

Figure 16:
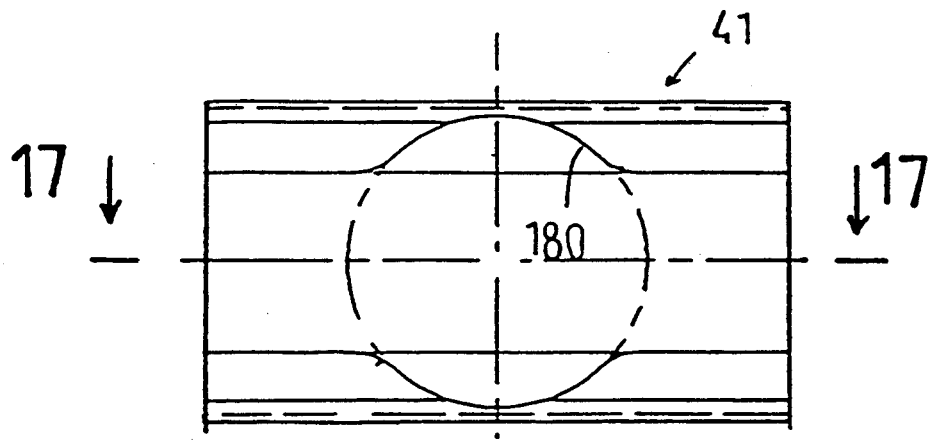
FIG. 16 is a view similar to FIG. 3 for this third embodiment.

FIG. 1 shows a double flywheel damper as disclosed in French published patent application No. FR 2 571 461A, being of the kind comprising an input part 12 and an output part 16. The input part 12 comprises two plates 13 and 13', in which windows 14 are formed for accommodating coil springs 15. The output part 16 comprises two plates 17 in the form of relatively thin rings. The two plates 13 and 13' are joined externally by means of a heavy ring 18 which acts as a spacer, and which is secured by riveting.

For each of the springs 15, two windows 14, which are generally similar to each other, are formed in line with each other in the two plates 13 and 13'. Each of the windows 14 has a rounded notch 20 (FIGS. 6 to 8) which is formed on each of the substantially radial edges of the window. Two such notches, corresponding with each other on the two plates 13 and 13', enable a rigid thrust insert 22, molded in plastics material, to be articulated between the spring 15 and the end of the window 14. Each insert 22 has two trunnions 24 which cooperate with the notches 20 in such a way as to permit outward pivoting. Each thrust insert 22 also has a cavity 25, FIG. 7, defined between the two trunnions 24, this cavity being so shaped as to cooperate with a finger 26 (FIGS. 6 to 8), which extends approximately circumferentially and which is formed by being pressed out from the outer periphery of the thin plate 17.

Each thrust insert 22 has a shoulder 29 on which one end of a spring 15 bears, together with a cylindrical centring portion which penetrates into the spring 15 and which is extended by a resilient boss 30. The centre of each end of the spring 15 is located closer to the axis of the damping device than the centre of inclination of the thrust insert 22 (see FIGS. 6 to 8). By virtue of the arrangements just described, the springs work under favourable conditions, in particular as a result of the pivoting movement which is due to the presence of the thrust inserts.

The input part 12 of the damper is arranged to be fastened to the crankshaft of the engine, by means of a hub 10 which is provided with passages for screws (not shown) whereby it is secured to the crankshaft. The plate 13 is fixed to the hub 10 by means of screws and is longer than the plate 13'.

The output part 16 of the damping device includes a plate 11 which acts as the reaction plate of the clutch, and which is arranged to be coupled by friction to a friction disc which is coupled to the input shaft of the gearbox for rotation with the latter. The input part 12 contains the springs 15, with the latter being mounted in a position lying axially between the reaction plate 11 and the plate 13.

A rolling bearing 9 is interposed radially between the hub 10 and a coupling plate 8, the latter being secured by screw threaded means to the reaction plate 11. The coupling plate 8 has a radial flange. The two thin plates 17, which are of pressed sheet metal, are engaged in the annular space which is defined axially between the reaction plate and this flange, so as to define annular radial thrust surfaces towards which, respectively, each of the thin plates 17 is axially urged. To this end, resilient means, which in this example take the form of two Belleville rings one of which is mounted radially around the other, are interposed axially between the two thin rings 17. Each of the latter carries a friction lining by means of which it is in frictional contact with the corresponding annular, radial thrust surface mentioned above.

The fingers 26 of the plate 17 are formed on radial arms 7 at the outer periphery of each of the thin plates 17.

Friction means 31 are provided between the plate 13 and the coupling plate 8, and comprise a friction ring, and the coupling plate 8 is provided with holes for cooperating with lugs of this friction ring, so as to couple the friction ring with the coupling plate for rotation together. A resilient ring is interposed between the coupling plate 8 and this friction ring, for contact of the latter with the plate 13.

At least one friction pad 40, FIGS. 2 and 3, is associated with each spring 15, the latter being helical springs in this example. Each friction pad 40 is designed for making contact with the internal surface 18' of the spacer ring 18. This pad 40 (FIGS. 6 to 8) is so shaped as to conform with the internal surface 18', so as to define a contact zone.

Associated with each friction pad 40 is an intermediate resilient member 50, which is deformable in the radial direction. Each member 50 has a first engagement zone 60 for engagement on a turn 1 of the spring 15, together with a second engagement zone 70 for contact with the friction pad 40. The intermediate resilient member 50 is interposed radially between the friction pad 40 and the spring 15, so that it is able to deform from a deployed position to a retracted position during operation of the damping device, with the friction pad being in permanent engagement with the contact zone 18' of the spacer ring 18.

In FIGS. 4 to 8, the intermediate resilient member 50 consists of a radially deformable elastic web which includes both the first engagement zone 60 and the second engagement zone 70. This web of the intermediate resilient member 50 has two main arms 71 and 71', and a secondary arm which defines the first engagement zone 60. The arms 71 and 71' form the branches of a U-shaped section, the base 74 of which projects from the first engagement zone 60. The latter is arched, and is separated from the arms 71 and 71' by means of slots. The zone 60 is longer than the arms 70 and 71', and terminates at its free end in a local deformation 63, which makes point or line contact with the friction pad 40. The zone 60 includes two tongues 61 and 61' which project substantially radially inwardly and which are suitably profiled. These tongues are formed by being pressed out from the web of the intermediate resilient member 50, forming an H-shaped opening 62 in the latter. The tongues 61 and 61' are divergent from each other, and engage on the turn 1 of the spring 15, on either side of the latter, so as to locate the zone 60 by engagement on the turn 1, which is circular in cross section. This engagement of the tongues 61 and 61' on the turn of the spring is by resilient gripping action, for which purpose the tongues are generally profiled to conform with the profile of the turn 1. For this reason they are inclined, and are also narrower than the opening 62. It should be noted that the tongues 61 and 61' engage only the radially outermost half of the turn 1, and that in this example the latter is the middle turn of the spring 15.

This arrangement enables the spring 15 to be compressed a little more, as can be seen in particular in FIG. 6. However, the tongues 61 and 61' may be arranged to extend further in the inward radial direction. It will also be noted that the opening 62 is formed in the region of the central part of the arched zone 60.

The arms 71 and 71' are part of the second engagement zone 70, and include tenons 72 and 72' which are of U-shaped cross section and which project laterally, being obtained by deformation of the material of the web of the intermediate resilient member 50. This deformation increases the rigidity of the tenons 72 and 72', and also extends into part of the arms 71 and 71', especially into the region of the roots of the tenons 72, 72' where they stem from the arms 71 and 71'. The tenons 72 and 72' cooperate with mortices 80 formed in the friction pad 40 (FIG. 3), so as to attach the member 50 to the pad 40. Attachment of the member 50 to the friction pad 40 is thus obtained by an assembly of the tenon and mortice type.

In this example the second engagement zone 70 is arched, as shown in FIGS. 2 and 6, so as to follow snugly the shape of the inner surface of the friction pad 40. It will also be noted that the opening 62 in inclined, and that the tenons 72 and 72' lie generally in alignment with the opening 62, see FIG. 5. The resilient member 50 is preferably mounted under pre-stress between the spring 15 and the friction pad 40, backed by the contact zone 18'.

Again, the friction pad 40 is preferably formed with a U-shaped cross section, the base of which is arched so as to follow the shape of the spacer ring 18, together with two generally radial wing portions for possible contact with the plates 13 and 13', and for acting as guides for the friction pad 40. The width of the pad 40 is at least equal to that of the spacer ring 18. Finally, a slight mounting clearance is provided.

The device operates in the following manner. When it is at rest, with the engine stopped, the configuration of the spring 15 with its associated friction pad 40 is as shown in FIG. 8. In this position the member 50 is in an extended configuration, being in contact partly with the friction pad 40 through the second engagement zone 70 of the member 50, and partly in engagement through the tongues 61 and 61' with the turn 1 of the spring. There is also contact between the local deformation zone 63 of the engagement zone 60 and the friction pad 40. In this extended condition of the member 50, this member is preferably prestressed.

When the engine is in a slow running mode, the configuration is as shown in FIG. 7, in which the member 50 deforms resiliently from its extended configuration to a compressed configuration, with the spring 15 deforming radially outwardly under the effect of centrifugal force. In this compressed condition of the member 50, the fingers 26 are not in contact with the base of the respective cavities 25, and the friction means 31 (FIG. 1) then operate as hitherto.

At engine speeds above the slow running mode, the configuration is as shown in FIG. 6. Here the fingers 26 are allowed to enter into contact with the base of the corresponding cavities 25, and, relative movement taking place between the input part 12 and the output part 16 of the device (FIG. 1), the springs 15 become compressed from the extended mode seen in FIGS. 7 and 8 to a retracted mode, until the resilient bosses 30 come into contact with each other. The friction pad 40 is urged into rubbing contact against the zone 18'.

It will be noted that during this stage, the spring 15 becomes uncurved due to the pivotal mounting of the thrust inserts 22; and also that the member 15 once again becomes radially extended, but in a less pronounced arched shape than in the configuration of FIG. 8. The friction pad 40 thus remains in contact with the zone 18'. This arrangement is of particular advantage in the context of a double flywheel damper. More particularly, in this type of torsion damping device, the resonance frequency is below the excitation frequency derived from the engine in the slow running mode. From then onwards, during deceleration and on stopping of the engine, the system passes through the resonance frequency, and the friction pad 40 acts effectively without there being any risk whatever of its being disengaged.

It will be appreciated that good stability of the friction pad is obtained in every case. Thus, during operation, the secondary arm which defines the first engagement zone 60 of the member 50 is deformed and its circumferential length is allowed to increase, so that during operation the contact point of the zone 63 is displaced, yet the friction pad 40 is firmly supported at each of its circumferential ends.

In order to improve the stability of the friction pad 40, it is possible to make the disposition of FIG. 5 symmetrical. In this case the arrangement is as shown in FIG. 10, in which the arms 171 and 171' are joined at each of their ends to the base 174 of a U. The first engagement zone 160 thus defines a central band which is joined to the base 174 at each of its ends.

In FIGS. 9 to 13, the second engagement zone 170 through which the intermediate resilient member, here denoted by the reference numeral 51, having arms 171 and 171', is again curved but in the opposite direction from the first zone 160. Engagement takes place by cooperation of respective elements and insertion into the mortices 80 of FIG. 3. In operation, the contact between the second zone 170 and the friction pad is thus initially at a minimum value, but subsequently increases (FIG. 12) and then slightly diminishes (FIG. 11). The friction pad 40 is again well supported, with the end portions of the base 174 of the member 51 being in contact with the friction pad 40 when the vehicle is running.

As before, the first engagement zone 160 and the second engagement zone 170 are arranged to move closer together during operation, the member 51 being mounted under prestress between the spring 15 and the friction pad 40, being in engagement with the latter through the contact zone 18'.

Figure 17:
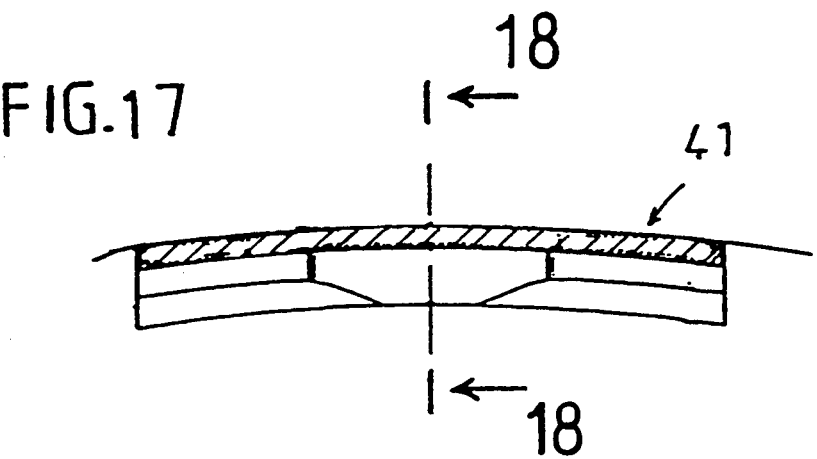
FIG. 17 is a view in cross section taken on the line 17—17 in FIG. 16.
Figure 18:
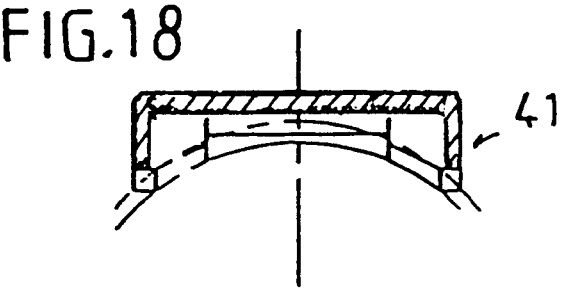
FIG. 18 is a view in cross section taken on the line 18—18 in FIG. 17.

Referring now to FIGS. 14 to 18 showing a third embodiment, in which the intermediate resilient member is indicated by the reference numeral 52, its tenons, 271 and 271', are here formed with a circular shape having a radial stiffening edge, as is best seen in FIGS. 14 and 15. The mortices 180 (FIG. 16) of the friction pad, here denoted by the reference numeral 41, are shaped in a complementary manner. In this embodiment, the second engagement zone, 270, includes two main arms forming the branches of a U, with the first engagement zone 260 having a secondary arm joined to the base of the U. The tongues 261, 261' are again formed by pressing, but a respective separate aperture 262, 262', is associated with each of these tongues.

It will be appreciated that the tongues 261 and 261' constitute the branches of a U with a rounded base (see FIG. 14), and that they may be easily mounted on a spring the coils of which are formed of square section wire as shown in the same Figure.

Modification of the tenons and mortices enables the friction pad to tilt during operation of the device.

Figure 19:
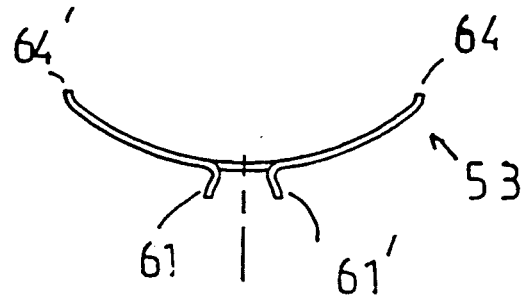
FIGS. 19 and 20 are views similar to FIGS. 4 and 5, showing a fourth embodiment.
Figure 20:
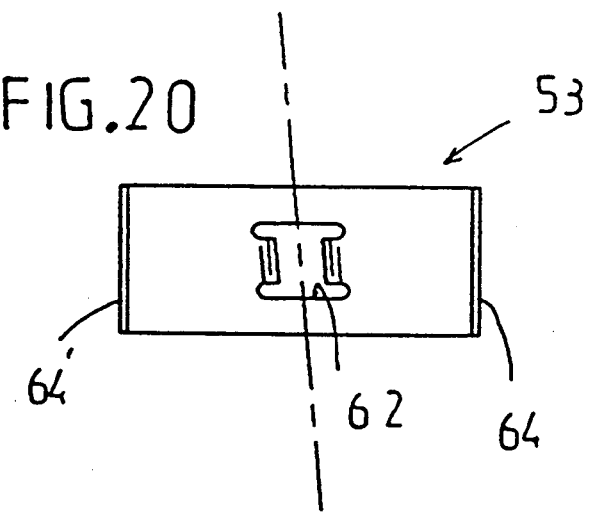

Whereas, in the embodiments described so far, the friction pad was of a single-member or monobloc type, it is possible to make it in two parts. Thus, as shown in the fourth embodiment shown in FIGS. 19 to 23, two friction pads 42 and 43 are provided, and are connected together through the resilient intermediate member 53. The member 53 has tongues 61 and 61', formed from the opening 62 as in the first embodiment. Here, however, the resilient member 53 is reduced to being a simple bowed plate with two bent-up lateral edges 64 and 64', forming part of the second engagement zone for anchoring in the pads 42 and 43. The radially bent-up edges 64 and 64' penetrate into corresponding grooves which are provided in the friction pads 42 and 43. In the rest position (FIG. 23), the distance between the friction pads 42 and 43 is at a minimum, but becomes increased during operation as is illustrated in FIGS. 21 and 22.

Although in the embodiments described above, the intermediate resilient member comprised a resilient tongue conformed in shape, it is possible also to use a wire spring 200, as is shown for example in FIGS. 24 to 26. The first and second engagement zones include, respectively, arms 64 and 66', and 65 and 65'. The spring 200 is so shaped as to have two parallel arms 66 and 66' at its inner periphery, these arms being arranged to come into gripping engagement on the turn 1 of the spring 15, being joined through inclined portions to two arms 65, 65' which are anchored in the friction pad, 44. It will be appreciated that the radially orientated arms 66 and 66' are bent round as shown in FIG. 26, and that in the free state, as with the tongues in the foregoing embodiments, their axial length is smaller than the diameter of the turn 1 of the spring so that they can grip it.

The invention is of course not limited to the embodiments described above. For example, the resilient element may include a block of an elastomeric material, which may comprise several layers having variable stiffness so as to produce better progressive action. Such a block may be fixed for example by adhesive bonding on to the friction pad 44, and carry metallic tongues of the same type as shown in FIG. 5, for engagement on the turn of the spring.

The shape of the coil spring (or spiral spring) may of course take any suitable form. For example, it may be of constant diameter as described above, or of non-constant diameter, that is to say for example of frusto-conical form, or in the form of two opposed conical portions, or in the form of a bell.

It will be noted that the spring may also be of diabolo shape, which was not possible in the case of the arrangement disclosed in U.S. Pat. No. 2,002,115 mentioned above. The spring wire section can of course be circular or square. In all cases, the coil springs constitute circumferentially acting resilient members. The provision of thrust inserts is not obligatory.

The invention is of course also applicable to a clutch of the friction disc kind, and the friction pad can also enter into contact with the outer edge of a window of a damper plate, of the kind conventionally incorporated in a friction clutch, as is described for example in French published patent application No. FR 2 495 256A. The coil spring may be of the variable pitch kind as described in that document. Again with reference to the same document, the guide rings of the torsion damper of the clutch may be secured directly on to the reaction plate of the clutch. Similarly, the torsion damping device may be associated with an hydraulic torque convertor in the manner described in the above mentioned U.S. Pat. No. 4,530,673, from which it can be seen that, if the spring is long enough, it is possible to associate with each spring several friction pads which are spaced circumferentially away from each other, with the associated turn of the spring, engaged with the friction pad, not necessarily being the middle turn.

What is claimed is:

1. A torsion damping device for a transmission system, comprising two rotatable parts, means for mounting the two rotatable parts coaxially for angular displacement with respect to each other, and a plurality of coil springs interposed between the two rotatable parts for resisting relative rotation between the two rotatable parts, wherein one of the two rotatable parts defines a contact zone, the device further comprising at least one friction pad associated with one of the coil springs and frictionally engaging the contact zone, and an intermediate resilient member associated with each said friction pad, wherein the intermediate resilient member is radially deformable and comprises a first engagement zone which is secured to a turn of the one coil spring and a second engagement zone which is secured to the associated said friction pad, the intermediate resilient member being radially interposed between the associated friction pad and the one coil spring, whereby the one coil spring is able during operation of the device to change between an extended mode and a retracted mode while the friction pad slides in permanent engagement with the contact zone.

2. A torsion damping device as recited in claim 1, wherein the intermediate resilient member comprises a plurality of tongues which grippingly engage the turn of the one coil spring.

3. A torsion damping device as recited in claim 2, wherein the intermediate resilient member comprises a web which is resiliently deformable, and wherein the first engagement zone projects centrally from the resilient web and is bowed.

4. A torsion damping device as recited in claim 1, wherein the second engagement zone comprises a plurality of tenons, and the associated friction pad defines mortices of complementary shape for cooperation with the tenons.

5. A torsion damping device for a transmission system, comprising two rotatable parts, means for mounting said rotatable parts coaxially for angular displacement with respect to each other, and a plurality of coil springs interposed between the two said rotatable parts, wherein one of the said rotatable parts defines a contact zone, the device further comprising at least one friction pad associated with a said spring and frictionally engaging said contact zone, and an intermediate resilient member associated with each said friction pad, said intermediate resilient member being radially deformable and comprising a first engagement zone for attachment with a turn of the associated said spring by a resilient gripping action, together with a second engagement zone for attachment with the associated said friction pad, the intermediate resilient member being interposed radially between the associated friction pad and the spring, whereby said spring is able during operation of the device to change between an extended mode and a retracted mode while the friction pad is in permanent engagement with said contact zone.

6. A damping device according to claim 1, wherein the said intermediate resilient member comprises a web which is resiliently deformable, and a plurality of tongues of the said web for gripping engagement on the turn of the said spring.

7. A damping device according to claim 6, wherein the said first engagement zone projects centrally from the resilient web, and is bowed.

8. A damping device according to claim 6, wherein said tongues engage only a radially outermost half of said turn.

9. A damping device according to claim 6, wherein said web is provided with tenons which project laterally for cooperation with mortices formed in the friction pad.

10. A damping device according to claim 5, wherein said intermediate resilient member is formed from spring wire having two parallel arms at its inner periphery, these said arms being arranged to come into gripping arrangement on the turn of said spring.

* * * * *

UNITED STATES PATENT AND TRADEMARK OFFICE
CERTIFICATE OF CORRECTION

PATENT NO. : 5,092,820

DATED : March 3, 1992

INVENTOR(S) : Jacky NAUDIN; Ciriaco BONFILIO

It is certified that error appears in the above-identified patent and that said Letters Patent is hereby corrected as shown below:

On the title page: Item [73]:

Name of Assignee incorrect:

Correct the spelling of the Assignee's name, it should be VALEO and not Valedo.

Signed and Sealed this

Twenty-ninth Day of June, 1993

Attest:

MICHAEL K. KIRK

Attesting Officer

Acting Commissioner of Patents and Trademarks